United States Patent
Ponson

(10) Patent No.: US 6,702,085 B1
(45) Date of Patent: Mar. 9, 2004

(54) CLUTCH RELEASE BEARING WITH SELF-ALIGNMENT BY MEANS OF ELASTIC SLEEVE

(75) Inventor: Frédéric Ponson, Luynes (FR)

(73) Assignee: SKF France, Montigny-le-Bretonneux (FR)

( * ) Notice: Subject to any disclaimer, the term of this patent is extended or adjusted under 35 U.S.C. 154(b) by 0 days.

(21) Appl. No.: 10/069,615

(22) PCT Filed: Aug. 24, 2000

(86) PCT No.: PCT/FR00/02366

§ 371 (c)(1),
(2), (4) Date: Jun. 5, 2002

(87) PCT Pub. No.: WO01/18419

PCT Pub. Date: Mar. 15, 2001

(30) Foreign Application Priority Data

Sep. 7, 1999 (FR) .............................................. 99 11187

(51) Int. Cl.[7] .............................................. F16D 23/14
(52) U.S. Cl. ...................... 192/98; 192/110 B; 384/612
(58) Field of Search ............................... 192/98, 110 B; 384/612

(56) References Cited

U.S. PATENT DOCUMENTS

| | | | |
|---|---|---|---|
| 3,904,008 A | | 9/1975 | Sonnerat |
| 4,181,380 A | * | 1/1980 | Vinel et al. .................. 384/611 |
| 4,365,850 A | * | 12/1982 | Perrichot et al. ............ 384/611 |
| 4,437,556 A | * | 3/1984 | Brandenstein et al. ........ 192/98 |
| 4,913,276 A | * | 4/1990 | Hayashi et al. ......... 192/85 CA |
| 5,113,988 A | | 5/1992 | Caron |
| 6,189,670 B1 | | 2/2001 | Ponson et al. |
| 6,464,060 B1 | * | 10/2002 | Ponson et al. ................. 192/98 |

FOREIGN PATENT DOCUMENTS

| | | |
|---|---|---|
| EP | 0 859 161 | 8/1998 |
| FR | 2 230 235 | 12/1974 |
| FR | 2 663 702 | 12/1991 |

* cited by examiner

Primary Examiner—Richard M. Lorence
(74) Attorney, Agent, or Firm—Smith, Gambrell & Russell

(57) ABSTRACT

The invention concerns a clutch release bearing comprising an engaging element capable of co-operating with a clutch diaphragm (29), and designed to be mounted on a manoeuvring element (2) mobile in translation under the action of a control member (6). The engaging element comprises a roller bearing (1) provided with a rotating ring (13) and a non-rotating ring (9), said engaging element being radially mobile relative to the manoeuvring element to be self-aligned by means of a radially elastic self-aligning sleeve (19), arranged in the bore of the non-rotating ring to co-operate with the manoeuvring element. The roller bearing is of the standard type comprising an outer peripheral surface and a cylindrical bore axially defined by two parallel radial surfaces, and at least a seal joint (18) mounted on one of the rings and in friction contact with the other ring, the sleeve comprising sealing means co-operating with a rotating part of the engaging element.

11 Claims, 2 Drawing Sheets

CLUTCH RELEASE BEARING WITH SELF-ALIGNMENT BY MEANS OF ELASTIC SLEEVE

The present invention relates to the field of clutch-release bearings, particularly for motor vehicles, of the kind comprising an operating element able to move in translation under the action of a control member such as a clutch-release fork or the piston of a hydraulic control, a thrust rolling bearing intended to act on the clutch-release device of a clutch, such as a diaphragm, and, between the thrust bearing and the operating element, a self-alignment elastic connecting member providing an axial connection between the thrust bearing and the operating element and allowing the thrust bearing to self-centre with respect to the diaphragm if the axis of the diaphragm and the axis the thrust bearing are not exactly coincident at the time of mounting. Such a release bearing is described, for example, in document FR-A-2 663 702.

The rings of thrust rolling bearings are made of pressed sheet metal. The inner ring comprises a radial portion extending outwards in contact with a radial flange of the operating element. The outer ring comprises a radial portion extending inwards for contact with the diaphragm.

The self-alignment elastic connecting member consists or an elastic sleeve lying between he bore of the non-rotating ring of the thrust bearing and a cylindrical bearing surface of the operating element. The sleeve, generally made of elastomere or of some equivalent flexible material, comprises in its bore a number of ribs which protrude radially with respect to the bore and run axially along he length of the sleeve. These ribs are slightly inclined and have the shape of leaves, the free ends of which rest against the cylindrical bearing surface of the operating member.

The ribs can thus deform and allow the bearing to move radially with respect to the operating element to self-align on the diaphragm during operation.

The self-alignment elastic connecting member is axially secured to the non-rotating ring of the thrust bearing by complementary shapes, by means of a radial flange or of an annular bore situated at its rear end, opposite the diaphragm, and collaborating with a stepped part of the bore of the ring, and of an annular groove formed at its front end and collaborating through complementary shapes with a radial return or the inner ring. An annular bore protecting from the front free end of the operating element forms an axal stop for the axial end of the ribs of the sleeve. The axial end of the sleeve is provided with a sealing lip in rubbing contact with the radial portion of the outer ring.

Sealing makes it possible, on the one hand, to avoid losing the grease which is used to lubricate the rolling bearing and, on the other hand, to prevent the ingress of foreign particles likely to contaminate the inside of the bearing. A sealing flange is arranged at the rear of the bearing and a sealing lip coming from the self-alignment elastic sleeve collaborates at the front of the thrust bearing with a surface of the rotating ring.

While this type of thrust bearing is satisfactory in most cases, it can happen that in certain applications and conditions of use which are extremely harsh in terms of contamination, the sealing may prove insufficient and result in the ingress of contaminants which affect the correct lubrication of the rolling bearing and thereby shorten the life of said rolling bearing.

It is not straightforward, In thrust rolling bearings in which the rings are made of pressed sheet metal, to arrange seals, particularly rubbing seals, very effectively because the often complex shapes and the geometric qualities of the pressed sheet metal rings often make the attachment of such seals awkward.

Furthermore, the quality of the surfaces which act as rubbing surfaces for the lips of the seals is not always very good.

The present invention aims to solve these problems by proposing a compact economical thrust bearing with a low number of parts and which is equipped with effective sealing means.

The clutch-release bearing device of the present invent is of the type comprising an engaging element capable of collaborating with a clutch diaphragm. The engaging element is intended to be mounted on an operating element able to move in translation under the action of a control member, the engaging element comprising a rolling bearing provided with a rotating ring and with a non-rotating ring, the said engaging element being able to move radially with respect to the operating element to allow it to self-align with respect to the diaphragm by virtue of a radially elastic self-alignment sleeve arranged in the bore of the non-rotating ring to collaborate with a bearing surface of the operating element. The bearing is of the conventional type comprising an outer peripheral surface and a bore which are cylindrical and bounded axially by two radial parallel faces, and at least one seal mounted on one of the rings and in rubbing contact with the other ring, the sleeve comprising a sealing means capable of collaborating with a rotating part of the engaging element.

As a preference, the engaging element comprises an engaging piece secured to the rotating ring and able to come into contact with the diaphragm, the sealing means of the sleeve rubbing against a surface of the engaging piece.

In one embodiment of the invention, the engaging piece is integral with the rotating ring.

In one embodiment of the invention, the sealing means of the sleeve comprises a lip formed as an integral part of the said sleeve.

In one embodiment of the Invention, the sealing means of the sleeve comprises a means for forming a narrow passage with a rotating surface of the engaging element.

In one embodiment of the invention, the sleeve is made of rubber.

In one of the embodiment of the invention, the sleeve comprises a metal insert in contact with the non-rotating ring.

Advantageously, the narrow passage is formed between one end of the insert and the engaging element.

Advantageously, the bearing seal is in rubbing contact with a surface-ground surface of the said other ring.

In one embodiment of the invention, the bearing comprises two seals.

In one embodiment of the invention, the sealing means of the sleeve comprises a lip able to come into contact with a rotating surface of the engaging element and a means for forming a narrow passage with another rotating surface of the engaging element.

Thus, the seals of the rolling bearing come into contact with surface-ground surfaces, hence giving very good quality sealing extending the life of the bearing. The sealing means of the sleeve make the ingress of contaminants into the space defined by the engaging piece and the rolling bearing, and therefore into the inside of the rolling bearing, all the more difficult.

The present invention will be better understood and other advantages will become apparent upon reading the detailed description of some embodiments taken by way of entirely non-limiting examples and illustrated by the appended drawings, in which.

Figure 1:
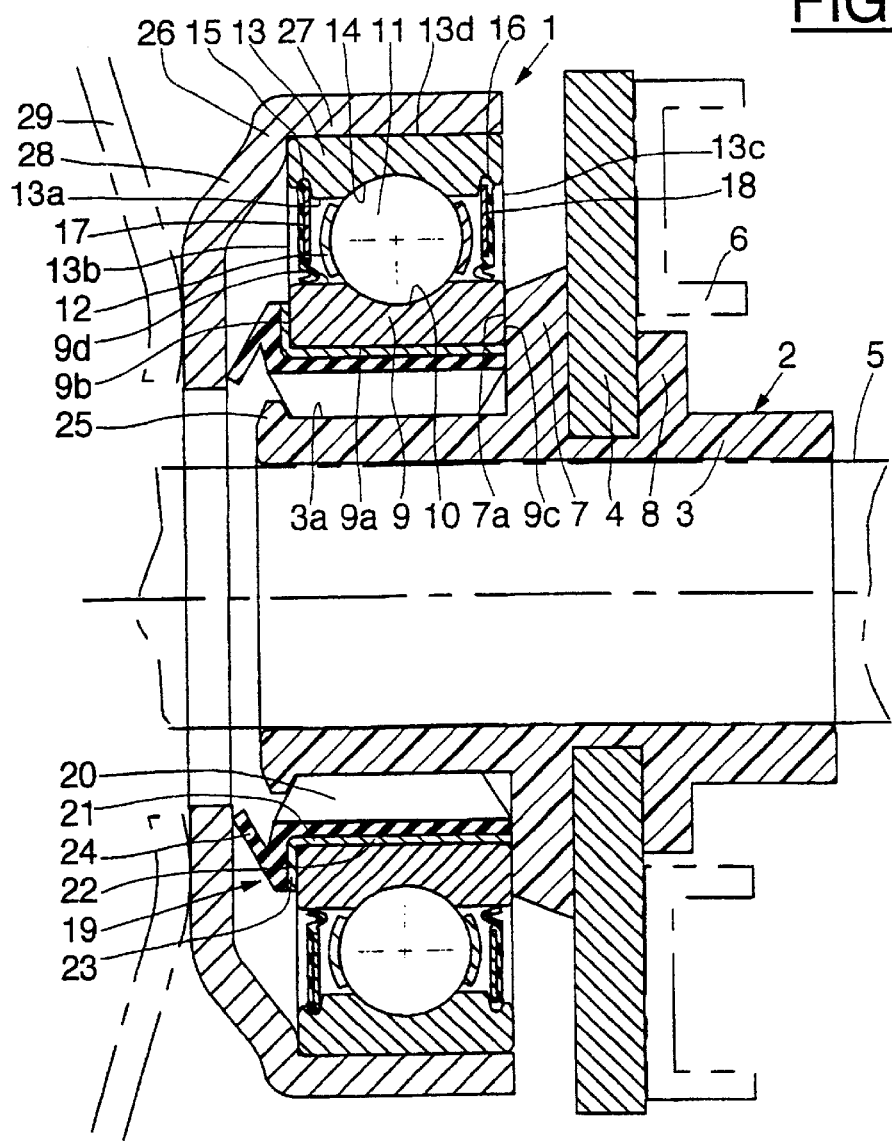
FIG. 1 is a view in axial section of a thrust rolling bearing according to the invention.

As illustrated in FIG. 1, the clutch-release bearing according to the invention comprises a rolling bearing 1 mounted on an operating element 2 which comprises a tubular portion 3 which car slide with respect to a guide tube 5 and a radial flange 4. The radial flange 4 of the operating element 2 is formed of a metal annulus over which the tubular portion 3 is moulded. The radial flange 4 has preferably undergone a surface hardening treatment, and acts as a contact surface for a control member 6 of the fork type and which exerts a force in an axial direction to cause the thrust bearing to move in its entirety during the clutch-release operation.

Two radial portions 7 and 8, integral with the tubular portion 3, are arranged one on each side of the radial flange 4, while at the same time having markedly smaller radial dimensions. The radial portion or 7 has a radial surface 7a against which the rolling bearing 1 bears. The radial portion 8 is arranged on the same side as the control member 6.

The rolling bearing 1 comprises an inner ring 9 having a toric raceway 10 for a row of rolling elements 11, for example balls, held in a cage 12. The inner ring 9 comprises a bore 9a, two radial frontal surfaces 9b and 9c and a cylindrical external surface 9d in which the raceway 10 has been formed. The bore 9a, the two radial frontal surfaces 9b and 9c forming the two faces of the ring, the cylindrical surface 9d and the raceway 10 are obtained by surface grinding, with an additional lapping operation in the case of the raceway 10.

The rolling bearing 1 is supplemented by an outer ring 13 which has a toric raceway 14 for the rolling elements 11. The outer ring 13 comprises a bore 13a in which the raceway 14 has been formed, two radial frontal surfaces 13b and 13c and a cylindrical external surface 13d. The cylindrical external surface 13d, the frontal surfaces 13b and 13c and the raceway 14 are obtained by surface grinding wish an additional lapping operation in the case of the raceway. Also formed in the bore 13a, are two annular grooves 15 and 16, each adjacent to one of the frontal surfaces 13b, 13c. A seal 17 is mounted in the groove 15 and comprises an elastic part extending from he groove 15 to the exterior surface 9d of the inner ring 9, ending in a rubbing lip, and a rigid part, for example a metal armature in the shape of a washer, which is radially shorter. A seal 18 identical to tie seal 17 is mounted in the groove 16.

The rings of the rolling bearings of conventional type are not made from blanks obtained by pressing a sheet metal strip.

They are obtained from tubes, bars or from forged blanks, by turning or hot or semi-hot forming, heat treatment, surface grinding of functionally flat, cylindrical or toric surfaces, and finally by lapping certain parts such as the raceways.

A self-alignment sleeve 19 is arranged between the tubular portion 3 and the bore 9a of the inner ring 9. The elastic sleeve 19, made, for example, of elastomer or of natural rubber, has a number of self-alignment ribs 20 parallel to the axis of the thrust bearing and directed towards the inside and the internal free edges of which come into contact with the exterior surface 3a of the tubular portion 3 of the operating element 2 which surfaces are made of rigid synthetic material, for example of synthetic material to which inorganic fillers or the like have been added.

The elastic sleeve 19 comprises an annular metal armature 21 provided with a cylindrical portion 22 arranged axially at the inner ring 9 of the bearing and pushed into the bore 9a and with a radial portion 23 extending the cylindrical portion 22 on the opposite side to the radial flange 4, facing outwards and increasing the rigidity of the armature. It can be seen that the axial lengths of the cylindrical portion 22 and of the inner ring 9 are identical and that the radial portion 23 is in contact with the frontal surface 9b. The cylindrical portion 22 and the radial portion 23 of the armature 21 are covered by the elastic material of the sleeve 19.

The elastic sleeve 19 comprises an annular lip 24 formed in the said elastic material and which seals the rolling bearing 1 by extending axially away from the radial flange 4 from the radial portion 23 of the metal armature 21. An annular rib 25 arranged at the end of the cylindrical portion 3 holds the rolling bearing 1 axially on the operating element 2. The sleeve 19 is also pushed onto the non-rotating ring 9 where it remains perfectly centered and held. Its axial position is guaranteed by the contact between the frontal surface 9c of the ring 9 and the surface 7a of the radial portion 7.

The rolling bearing 1 comprises an engaging element 26, for example made of pressed and treated sheet metal, a cylindrical part 27 of which is pushed onto the exterior surface 13d of the outer ring 13 and also comprises a roughly radial part 28 extending towards the inside from the cylindrical portion 27 as far as the sleeve 19. A clutch diaphragm 29, or an element of the same kind, is in contact with the radial portion 28 on the opposite side to the bearing. The sealing lip 24 rubs against the radial portion 28 on the same side as the rolling bearing.

Thus, on the same side as the diaphragm 29, sealing is twofold, with the lip 24 of the sleeve 19 rubbing against the surface of the engaging piece 26, and the seal 17 the lip of which rubs against the exterior surface 9d of the inner ring 9. On the opposite side, sealing is provided by the seal 18. The rotating part is formed by the outer ring 13 and the engaging piece 26. The non-rotating part is formed by the inner ring 9. The two parts, rotating and non-rotating, form the engaging element 1 which is mounted on the operating element 2 via the self-alignment sleeve 19.

It would be possible, without departing from the scope of the invention, to envisage the engaging piece 26 being integral with the outer ring of the bearing, the said engaging piece then being in the form of a simple axial extension of the rotating outer ring on one of its sides.

Figure 2:
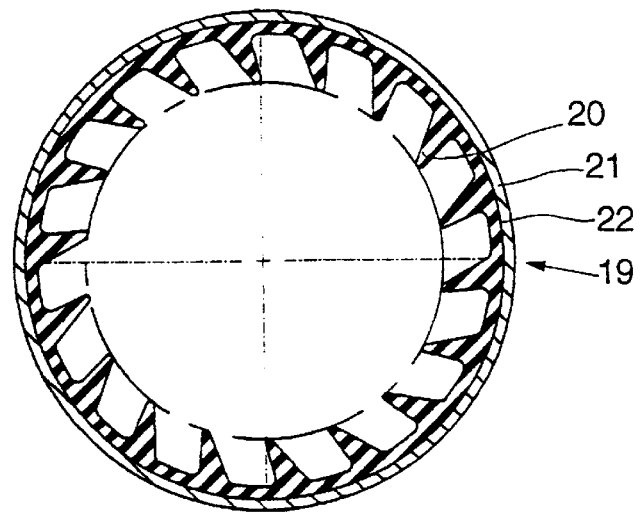
FIG. 2 is a view in cross section of the sleeve of the thrust rolling bearing of FIG. 1.
Figure 3:
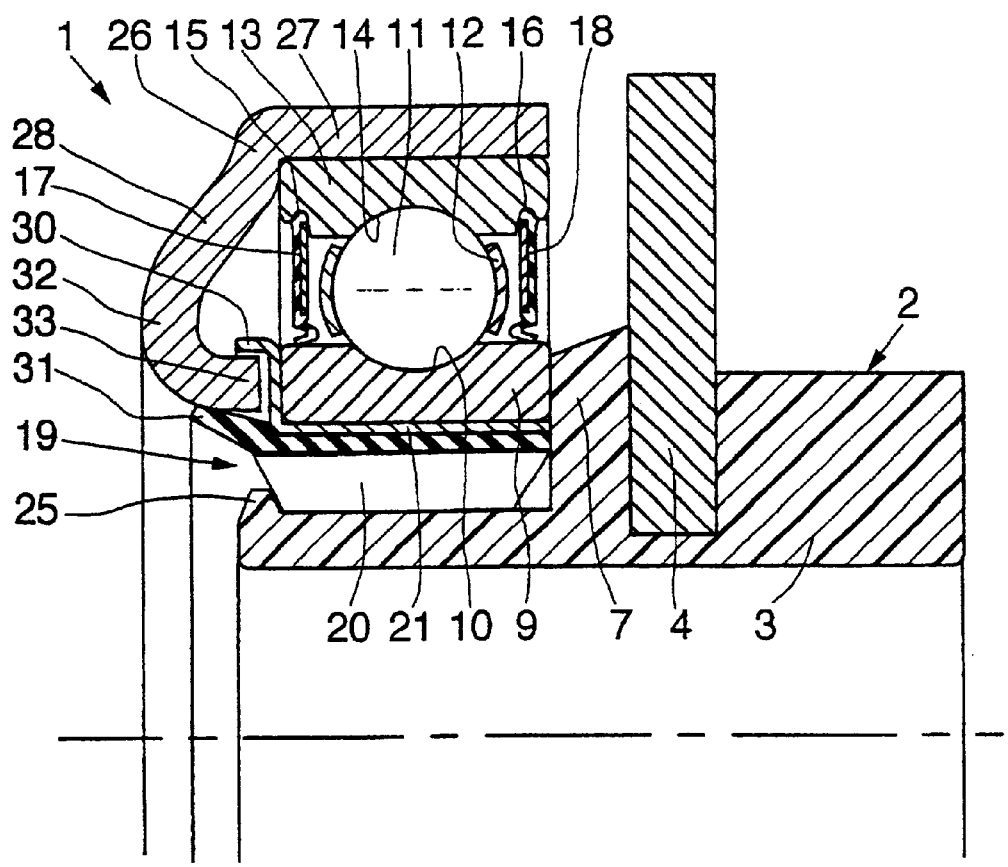
FIG. 3 is a view similar to FIG. 1 of another embodiment of the invention.

The embodiment illustrated in FIG. 2 is similar to the previous one except that the metal armature 21 of the sleeve 19 comprises a cylindrical portion 30 extending from the free end of the radial portion 23 towards the diaphragm 29. The sleeve 19 comprises a sealing lip 31 extending towards the diaphragm 29 and radially extending slightly outwards from a region lying radially between the ribs 20 and the bore 9a of the inner ring 9.

The radial part of the engaging piece 26 is replaced by a rounded part 32 which is convex on the side of the diaphragm 29, and which ends in a cylindrical free end 33 radially level with the inner ring 9 and axially adjacent to the radial portion 23 of the armature 21.

The free end 33 of the engaging piece 26 is surrounded on the inside by the lip 31 which rubs on It and on the outside by the cylindrical portion 30 of the armature 21 with which it forms a narrow passage. This twofold sealing makes it possible to further improve the sealing performance or, as an alternative, to omit the seal 17 of FIG. 1, in order to reduce the cost.

The combination of a sealed conventional rolling bearing with a self-alignment sleeve what has radial elasticity therefore gives the possibility of producing a clutch-release bearing with better sealing consisting of the sealing inherent to the rolling bearing and the additional sealing resulting from the self-alignment sleeve.

What is claimed is:

1. A clutch-release bearing device comprising an operating element and an engaging element capable of collaborating with a clutch diaphragm, the engaging element being intended to be mounted on the operating element able to move in translation under the action of a control member, the engaging element comprising a rolling bearing provided with a rotating ring and with a non-rotating ring, the engaging element being able to move radially with respect to the operating element to allow it to self-align with respect to the diaphragm by virtue of a radially elastic self-alignment sleeve arranged in the bore of the non-rotating ring to collaborate with a bearing surface of the operating element, the bearing comprising an outer peripheral surface and a bore which are cylindrical and bounded axially by two radial parallel faces, and at least one seal mounted on one of the rings and in rubbing contact with the other ring, the sleeve comprising a sealing means capable of collaborating with a rotating part of the engaging element.

2. The device according to claim 1, wherein the engaging element comprises an engaging piece secured to the rotating ring and able to come into contact with the diaphragm, the sealing means of the sleeve rubbing against a surface of the engaging piece.

3. The device according to claim 2, wherein the engaging piece is integral with the rotating ring.

4. The device according to claim 1, wherein the sealing means of the sleeve comprises a lip formed as an integral part of the said sleeve.

5. The device according to claim 1, wherein the sealing means of the sleeve comprises a means for forming a narrow passage with a rotating surface of the engaging element.

6. The device according to claim 1, wherein the sleeve is made of rubber.

7. The device according to claim 1, wherein the sleeve comprises a metal insert in contact with the non-rotating ring.

8. The device according to claim 7, wherein the sealing means of the sleeve comprises a narrow passage that is formed between one end of the insert and a rotating surface of the engaging element.

9. The device according to claim 1, wherein the bearing seal is in rubbing contact with a surface-ground surface of the said other ring.

10. The device according to claim 1, wherein the bearing comprises two seals.

11. The device according to claim 1, wherein the sealing means of the sleeve comprises a lip able to come into contact with a rotating surface of the engaging element and a means for forming a narrow passage with another rotating surface of the engaging element.

* * * * *